(12) United States Patent
Teh et al.

(10) Patent No.: US 11,609,709 B2
(45) Date of Patent: Mar. 21, 2023

(54) MEMORY CONTROLLER SYSTEM AND A METHOD FOR MEMORY SCHEDULING OF A STORAGE DEVICE

(71) Applicant: SKYECHIP SDN BHD, Penang (MY)

(72) Inventors: Chee Hak Teh, Bayan Lepas Pulau Pinang (MY); Yu Ying Ong, Bayan Lepas Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 178 days.

(21) Appl. No.: 17/141,723

(22) Filed: Jan. 5, 2021

(65) Prior Publication Data

US 2022/0100423 A1 Mar. 31, 2022

(30) Foreign Application Priority Data

Sep. 28, 2020 (MY) .............................. PI2020005066

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01); *G06F 3/061* (2013.01); *G06F 3/067* (2013.01)

(58) Field of Classification Search
CPC .... G06F 3/0659; G06F 3/0604; G06F 3/0673; G06F 3/067; G06F 3/061
See application file for complete search history.

(56) References Cited

U.S. PATENT DOCUMENTS

| 2006/0090044 | A1  | 4/2006  | Hillier, III et al. |
| 2010/0153636 | A1  | 6/2010  | Huang et al. |
| 2020/0081652 | A1* | 3/2020  | Nukala ................. G06F 3/0659 |
| 2020/0119753 | A1* | 4/2020  | Chirca ................ G06F 12/1009 |
| 2021/0405885 | A1* | 12/2021 | Kim ...................... G06F 3/0619 |

FOREIGN PATENT DOCUMENTS

TW              201719431       *  6/2017   ........... G06F 3/0679

* cited by examiner

*Primary Examiner* — Masud K Khan

(57) ABSTRACT

A memory controller system comprising a scheduling module, a data buffer module, a global order buffer module and a linked-list controlling module. The linked-list controlling module is configured to receive and process a first command comprising a write command or a read command. The linked-list controlling module constructs at least one linked-list head based on scheduling dependencies and determines whether the first command is dependency-hit by comparing the first command with the existing commands buffered in the global order buffer module. If the first command is dependency-hit, the linked-list controlling module is configured to trigger a write merging process or a read snarfing process.

15 Claims, 6 Drawing Sheets

```
Receiving a first command by a linked-list controlling module (3)
```
```
Determining the first command is a write command or a read command
```
```
Triggering a write merging process or a read snarfing process if the first command is dependency-hit
```
```
Processing the first command with the existing command to form a next command
```
```
Loading the next command into the global order buffer module (4)
```
```
Arranging data associating the next command in a data buffer module (2)
```
```
Scheduling the next command by a scheduling module (8) for retrieving and transferring the data associating the next command from the data buffer module (2)
```

```
┌─────────────────────────────────────────────────────┐
│ Receiving a first write command by a linked-list controlling │
│                     module (3)                      │
└─────────────────────────────────────────────────────┘
                          ↓
┌─────────────────────────────────────────────────────┐
│ Comparing the first write command with the existing write │
│  commands buffered in a global order buffer module (4) to │
│ determine whether the first write command is dependency-hit │
└─────────────────────────────────────────────────────┘
                          ↓
┌─────────────────────────────────────────────────────┐
│ Triggering a write merging process if the first write command is │
│                   dependency-hit                    │
└─────────────────────────────────────────────────────┘
                          ↓
┌─────────────────────────────────────────────────────┐
│ Processing the first write command with the existing write │
│          command to form a next write command        │
└─────────────────────────────────────────────────────┘
                          ↓
┌─────────────────────────────────────────────────────┐
│ Loading the next write command into the global order buffer │
│                     module (4)                      │
└─────────────────────────────────────────────────────┘
                          ↓
┌─────────────────────────────────────────────────────┐
│ Arranging write data associating the next write command in a │
│              data buffer module (2)                 │
└─────────────────────────────────────────────────────┘
                          ↓
┌─────────────────────────────────────────────────────┐
│ Scheduling the next write command by a scheduling module (8) │
│ for retrieving and transferring the write data associating the next │
│    write command from the data buffer module (2)    │
└─────────────────────────────────────────────────────┘
```

Figure 3

MEMORY CONTROLLER SYSTEM AND A METHOD FOR MEMORY SCHEDULING OF A STORAGE DEVICE

CROSS-REFERENCE TO RELATED APPLICATIONS

This application claims priority to MY Patent Application No. P12020005066 filed on Sep. 28, 2020, the entire contents of which are hereby incorporated by reference.

TECHNICAL FIELD

This invention relates generally to memory management. More particularly, the present invention relates to a memory controller system and a method for memory scheduling of a storage device.

BACKGROUND ART

In current scenario while designing a computing system, detailed emphasis is necessary to be laid on two common goals which are increasing performance and decreasing power consumption. Since main memory of a system is one of the key resources that a program needs to run, it acts as a major contributor towards both system's performance and power consumption. Main memory's performance depends on the way it accesses its contents. It is memory controller's access scheduler that decides which command to issue in every dynamic random access memory (DRAM) clock cycle on the basis of employed memory access scheduling policy.

Based on existing access strategies, DRAM operations are scheduled in such a way that it reduces DRAM's latency and power consumption. Some of these examples are discussed in following prior art references:—

US20100153636A1 discloses a control system for memory access includes a system memory access command buffer, a memory access command parallel processor, a DRAM command controller and a read data buffer. The system memory access command buffer stores plural system memory access commands. The memory access command parallel processor is connected to the system memory access command buffer for fetching and decoding the system memory access commands to plural DRAM access commands, storing the DRAM access commands in DRAM bank command FIFOs, and performing priority setting according to a DRAM bank priority table. The DRAM command controller is connected to the memory access command parallel processor and a DRAM for receiving the DRAM access commands, and sending control commands to the DRAM. The read data buffer is connected to the DRAM command controller and the system bus for storing the read data and rearranging a sequence of the read data.

US20060090044A1 discloses a memory controller optimizes execution of a read/modify/write (RMW) command by breaking the RMW command into separate and unique read and write commands that do not need to be executed together, but just need to be executed in the proper sequence. The most preferred embodiments use a separate RMW queue in the controller in conjunction with the read queue and write queue. In other embodiments, the controller places the read and write portions of the RMW into the read and write queue, but where the write queue has a dependency indicator associated with the RMW write command in the write queue to insure the controller maintains the proper execution sequence. The embodiments allow the memory controller to translate RMW commands into read and write commands with the proper sequence of execution to preserve data coherency.

The aforementioned references may strive to provide improved memory controller architecture. Nevertheless, they still have a number of limitations and shortcomings. For instance, the memory controllers in the aforementioned references have to maintain an age-based matrix or fixed assignments of read/write command queues to arbitrate for DRAM bandwidth via an age-based scheduling policy. Furthermore, the afore-mentioned references handle read and write commands independently without an ability to convert memory cycles.

Accordingly, there remains a need to have a memory controller system which overcomes the aforesaid problems and shortcomings.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a memory controller system that facilitates age and priority-based scheduling without having to maintain an age-based matrix.

It is also an objective of the present invention to provide a memory controller system that allows seamless conversion between read and write cycles to support write merging and read snarfing to increase performance.

It is yet another objective of the present invention to provide a memory controller system that supports controller-based caching to improve performance.

It is a further objective of the present invention to provide a memory controller system that supports controller-based atomic operations.

It is also an objective of the present invention to provide a method for memory scheduling of a storage device.

Accordingly, these objectives may be achieved by following the teachings of the present invention. The present invention relates to a memory controller system for a storage device comprising: a scheduling module; characterized by a data buffer module comprising a write data unit, a read data unit and a snort data first-in-first-out buffer, to store data transferred to or received from the storage device; a global order buffer module comprising a read command buffer, a read-write command buffer and a read-merge command buffer, to buffer a plurality of existing commands; and a linked-list controlling module to receive and process a first command comprising a write command or a read command; wherein the linked-list controlling module constructs at least one linked-list head based on scheduling dependencies and determines whether the first command is dependency-hit by comparing the first command with the existing commands buffered in the global order buffer module; whereby if the first command is dependency-hit, the linked-list controlling module is configured to trigger a write merging process or a read snarfing process, processing the first command with the existing command to form a next command, loading the next command into the global order buffer module, arranging data associating the next command in the data buffer module, and scheduling the next command by the scheduling module for retrieving and transferring the data associating the next command from the data buffer module.

The present invention also relates to a method for memory scheduling of a storage device, said method comprising the steps of: receiving a first command by a linked-list controlling module; determining the first command is a write command or a read command; and comparing the first command with the existing commands buffered in a global order buffer module to determine whether the first command is dependency-hit; wherein if the first command is dependency-hit, triggering a write merging process or a read snarfing process, processing the first command with the existing command to form a next command, loading the next command into the global order buffer module, arranging data associating the next command in a data buffer module, and scheduling the next command by a scheduling module for retrieving and transferring the data associating the next command from the data buffer module.

The present invention also relates to a method for memory scheduling a write command of a storage device, said method comprising the steps of: receiving a first write command by a linked-list controlling module; and comparing the first write command with the existing write commands buffered in a global order buffer module to determine whether the first write command is dependency-hit; wherein if the first write command is dependency-hit, triggering a write merging process, processing the first write command with the existing write command to form a next write command, loading the next write command into the global order buffer module, arranging write data associating the next write command in a data buffer module, and scheduling the next write command by a scheduling module for retrieving and transferring the write data associating the next write command from the data buffer module.

The present invention also relates to a method for memory scheduling a read command of a storage device, said method comprising the steps of: receiving a first read command by a linked-list controlling module; and comparing the first read command with the existing read commands and the existing write commands buffered in a global order buffer module to determine whether the first read command is dependency-hit; wherein if the first read command is dependency-hit, triggering a read snarfing process, processing the first read command with the existing read command or the existing write command to form a next read command, loading the next read command into the global order buffer module, arranging data associating the next read command in a data buffer module, and scheduling the next read command by a scheduling module for retrieving and transferring the read data or the write data associating the next read command from the data buffer module.

The present invention also relates to a method for performing an atomic operation of a storage device, said method comprising the steps of: receiving an atomic access by a linked-list controlling module; fetching read data associating the atomic access from a storage device to a data modifier; storing atomic data associating the atomic access in the data modifier; modifying the fetched read data in accordance with the atomic data in the data modifier; and arranging the modified data in a write data buffer.

The present invention also relates to a method for performing data caching of a storage device, said method comprising the steps of: receiving a command by a linked-list controlling module; and determining whether the command is a cache-hit; wherein if the command is a read command, triggering a read snarfing process, snarfing cache data associating the read command in a data buffer module, and scheduling the read command by a scheduling module for retrieving and transferring the cache data associating the read command from the data buffer module; wherein if the command is a write command, triggering a write merging process, merging cache data associating the write command in a data buffer module, and scheduling the write command by a scheduling module for retrieving and transferring the cache data associating the write command from the data buffer module.

The foregoing and other objects, features, aspects and advantages of the present invention will become better understood from a careful reading of a detailed description provided herein below with appropriate reference to the accompanying drawings.

BRIEF DESCRIPTION OF THE DRAWING

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiment of this invention and is therefore not to be considered limiting of its scope, for the invention may admit to other equally effective embodiments.

These and other features, benefits, and advantages of the present invention will become apparent by reference to the following text figure, with like reference numbers referring to like structures across the view, wherein:

FIG. 2 shows a method for memory scheduling of a storage device according to an embodiment of the present invention.

FIG. 3 shows a method for memory scheduling a write command of a storage device according to an embodiment of the present invention.

DETAILED DESCRIPTION OF THE INVENTION

Figure 1:
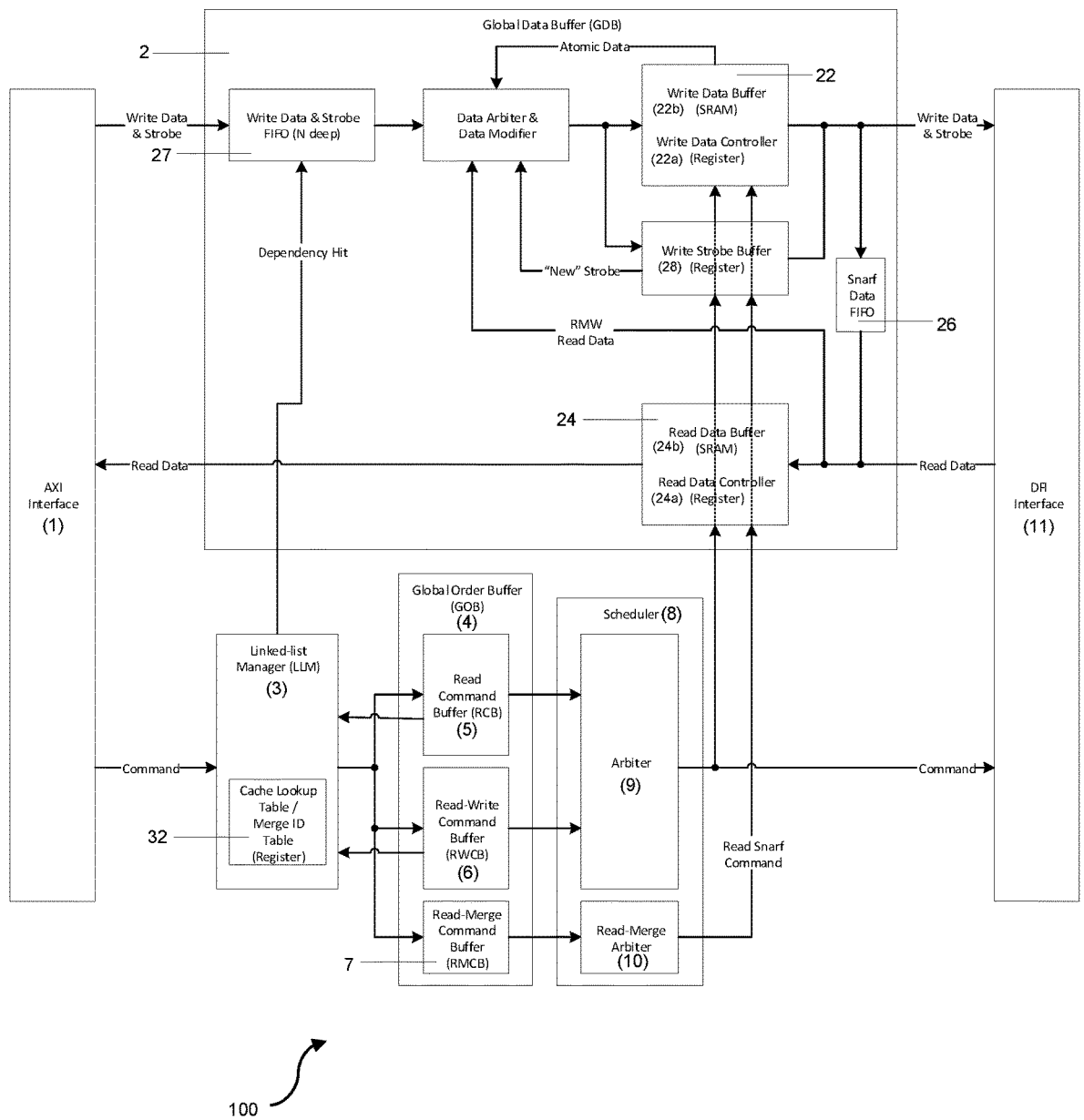
FIG. 1 is a block diagram of a memory controller system for a storage device according to an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings as shown in FIGS. 1 to 6, the invention will now be described in more details.

Referring to FIG. 1, the present invention relates to a memory controller system (100) for a storage device comprising: a scheduling module (8); characterized by a data buffer module (2) comprising a write data unit (22), a read data unit (24) and a snarf data first-in first-out buffer (26), to store data transferred to or received from the storage device; a global order buffer module (4) comprising a read command buffer (5), a read-write command buffer (6) and a read-merge command buffer (7), to buffer a plurality of existing commands; and a linked-list controlling module (3) to receive and process a first command comprising a write command or a read command; wherein the linked-list controlling module (3) constructs at least one linked-list head based on scheduling dependencies and determines whether the first command is dependency-hit by comparing the first command with the existing commands buffered in the global order buffer module (4); whereby if the first command is dependency-hit, the linked-list controlling module (3) is configured to trigger a write merging process or a read snarfing process, processing the first command with the existing command to form a next command, loading the next command into the global order buffer module (4), arranging data associating the next command in the data buffer module (2), and scheduling the next command by the scheduling module (8) for retrieving and transferring the data associating the next command from the data buffer module (2).

In accordance with an embodiment of the present invention, the memory controller system (100) is arranged to act as a liaison between a processor and a storage device. The storage device can be a dynamic random access memory (DRAM) or may be implemented using other memory technologies. Further, DRAM standards include, but not limited to, high bandwidth memory (HBM) standard, dual data rate (DDR) standard and low-power dual data rate (LPDDR) standard. Likewise, it is readily understood that the DRAM standards include, but not limited to, different generations of aforesaid standards such as HBM3 and DDR5.

In accordance with an embodiment of the present invention, the communication interface (1) is Advanced eXtensible Interface (AXI).

In accordance with an embodiment of the present invention, the memory interface (11) is DDR PHY Interface (DFI) which is used to transfer command and data to and from the storage device or the DRAM device via a memory PHY.

In accordance with an embodiment of the present invention, the linked-list controlling module (3) builds a linked-list based on dependencies, for example, same bank accesses, to allow for pre-scheduling age information to be stored in the linked-list itself.

In accordance with an embodiment of the present invention, the data buffer module (2) refers to memory storage used to temporarily store data while the data is being moved from one place to another. For example, the data buffer module (2) comprises static random access memory (SRAM). The SRAM can be a simple dual port SRAM or a true dual port SRAM.

In accordance with an embodiment of the present invention, the linked-list controlling module (3) comprises a cache matching unit (32). The cache matching unit (32) can be a cache lookup table or a merge identity table which acts as a register to store identity of each command. The register allows for a comparison between an identity of a new command and identity of existing commands. Upon a lookup hit, the linked-list controlling module (3) may tag the new command to either merge or snarf the cache entry that it hits. The command refers to a read command or a write command. The cache matching unit (32) comprises a linked-list construction logic to build a linked-list based on address dependencies and/or DRAM resource dependencies.

In accordance with an embodiment of the present invention, the linked-list controlling module (3) constructs dependencies of incoming or new commands to allow the relative age, priority and/or access order of the commands or the memory accesses to be maintained. For example, the read/write command with scheduling dependency is linked in a multi-layer linked list comprising of the head of the linked-list being the oldest memory access or command to the same memory/storage bank before it is retired in the global order buffer module (4). There could be multiple linked list heads, for example, one for each DRAM bank, in the linked-list controlling module (3) that may be linked together based on the relative age of the different heads of the linked-list. This helps to preserve the relative age information for scheduling where the head of the linked-list is always the oldest memory access or command that is non-dependent on any younger memory access or command with the same dependency on the same memory/storage resource, for example, the same DRAM bank. Once retired in the global order buffer module (4), the read/write command can be considered to be globally ordered and subsequently scheduling of the read/write command to the DRAM can be done in any order, allowing the memory controller system (100) to schedule the read/write command to best make use of the DRAM bandwidth while adhering to the timing restrictions of the DRAM memory.

In accordance with an embodiment of the present invention, the dependency-hit occurs when a new command and an existing command are going to the same address.

In accordance with an embodiment of the present invention, the read-write command buffer (6) can handle read or write cycles independently. For example, the read-write command buffer (6) can handle read commands during heavy memory read traffic. Likewise, the read-write command buffer (6) can be dynamically reallocated to handle write commands during light memory read traffic.

In accordance with an embodiment of the present invention, the data buffer module (2) further comprises a write data and strobe first-in-first-out buffer (27) and a write strobe buffer (28) to control write data and buffer byte using strobe.

In accordance with an embodiment of the present invention, the write data unit (22) comprising a write data controller (22a) and a write data buffer (22b) for identifying the write command and retrieving write data from the write data buffer (22b).

In accordance with an embodiment of the present invention, the read data unit (24) comprising a read data controller (24a) and a read data buffer (24b) for identifying the read command and retrieving read data from the read data buffer (24b).

In accordance with an embodiment of the present invention, the scheduling module (8) comprises an arbiter (9) and a read-merge arbiter (10) operating in parallel because the read-merge command from the read-merge arbiter (10) does not go to the storage device or the DRAM device and circulates only in the memory controller system (100).

In accordance with an embodiment of the present invention, the memory controller (100) is scalable to support caching to increase performance by maintaining a data cache with configurable cache and allocation schemes. For example, the memory controller (100) is scalable by converting the read data buffer (24b) and write data buffer (22b) into a single set-associative cache that supports both read and write data. Through the single set-associative cache, a cache tag array can be maintained in the linked-list controlling module (3) and the dependency check handler in the linked-list controlling module (3) can be used to look up the tag array and manage the cache eviction. Since the cache storage is larger and has more ways, it increases the possibility of a cache hit and thus leads to higher write merge and read snarf probability. Accordingly, the accesses to the storage device can be reduced.

In accordance with an embodiment of the present invention, the data buffer module (2) further comprises a data modifier and a data arbiter to support atomic operations of the memory controller system (100).

Referring to FIG. 2, the present invention also relates to a method (200) for memory scheduling of a storage device, said method comprising the steps of: receiving a first command by a linked-list controlling module (3); determining the first command is a write command or a read command; and comparing the first command with the existing commands buffered in a global order buffer module (4) to determine whether the first command is dependency-hit; wherein if the first command is dependency-hit, triggering a write merging process or a read snarfing process, processing the first command with the existing command to form a next command, loading the next command into the global order buffer module (4), arranging data associating the next command in a data buffer module (2), and scheduling the next command by a scheduling module (8) for retrieving and transferring the data associating the next command from the data buffer module (2).

In accordance with an embodiment of the present invention, the write merging process is triggered if the first command is the write command.

In accordance with an embodiment of the present invention, the read snarfing process is triggered if the first command is the read command.

Referring to FIG. 3, the present invention also relates to a method (200a) for memory scheduling a write command of a storage device, said method (200a) comprising the steps of: receiving a first write command by a linked-list controlling module (3); and comparing the first write command with the existing write commands buffered in a global order buffer module (4) to determine whether the first write command is dependency-hit; wherein if the first write command is dependency-hit, triggering a write merging process, processing the first write command with the existing write command to form a next write command, loading the next write command into the global order buffer module (4), arranging write data associating the next write command in a data buffer module (2), and scheduling the next write command by a scheduling module (8) for retrieving and transferring the write data associating the next write command from the data buffer module (2).

In accordance with an embodiment of the present invention, the first write command is associated with a write data and the write data is received by the data buffer module (2).

In accordance with an embodiment of the present invention, the write data is received by a write data and strobe first-in-first-out buffer (27) of the data buffer module (2).

In accordance with an embodiment of the present invention, the step of processing the first write command with the existing write command comprising: dropping the first write command; merging the first write command into the existing write command to form a next write command; and determining identity of the existing write command.

In accordance with an embodiment of the present invention, the step of arranging the write data associating the next write command in the data buffer module (2) comprising the steps of: receiving signal from the linked-list controlling module (3) of the next write command and identity of the existing write command; loading the write data from the write data and strobe first-in-first-out buffer (27) to a write data buffer (22b) in the data buffer module (2); and merging new strobe with existing strobe in the write strobe buffer (28).

In accordance with an embodiment of the present invention, the step of retrieving and transferring the write data associating the next write command comprising the steps of: retrieving the write data associating the next write command using the identity of the existing write command; verifying the identity of the existing write command at the linked-list controlling module (3); and transferring the write data associating the next write command from the data buffer module (2).

Figure 4:
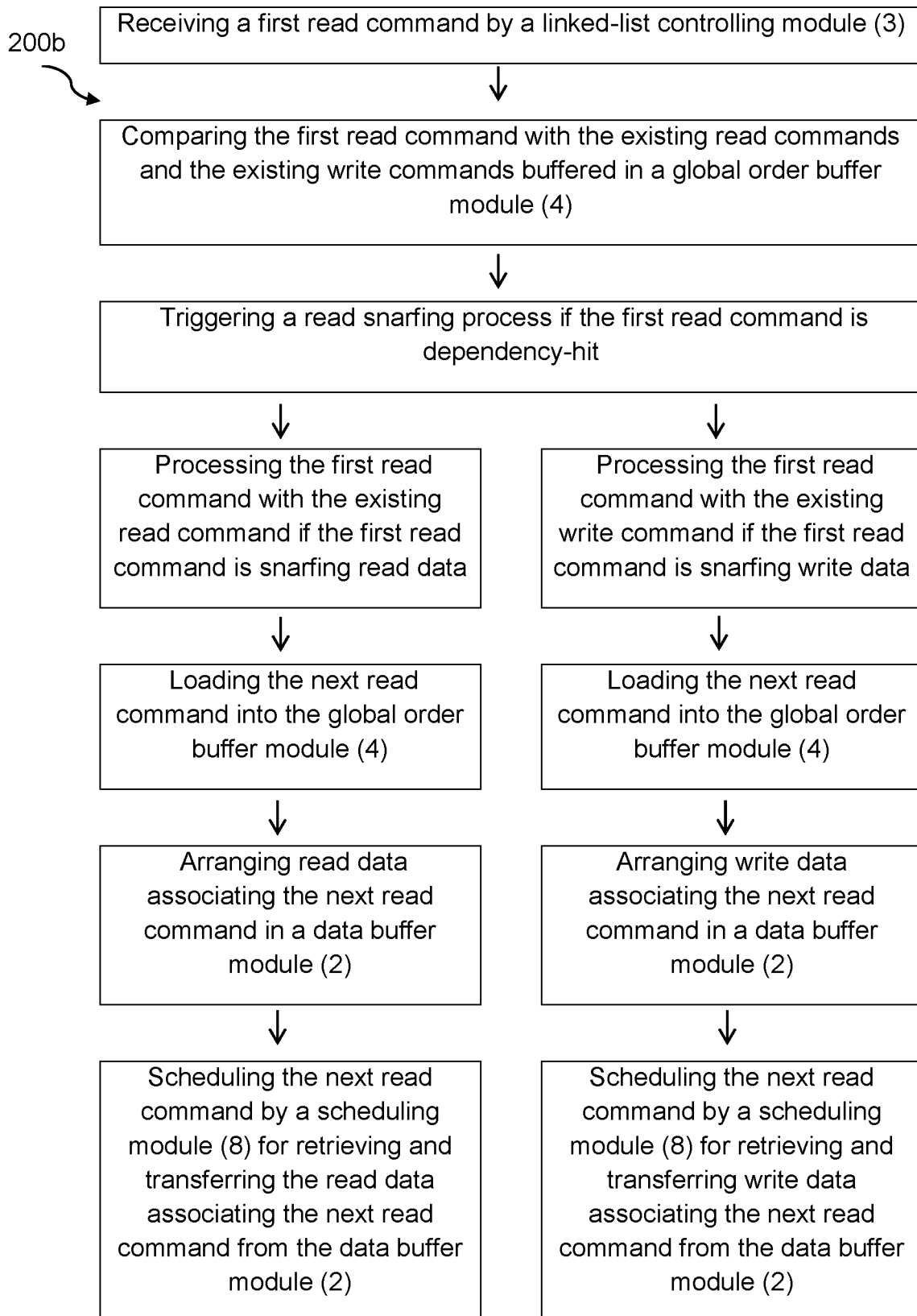
FIG. 4 shows a method for memory scheduling a read command of a storage device according to an embodiment of the present invention.

Referring to FIG. 4, the present invention also relates to a method (200b) for memory scheduling a read command of a storage device, said method (200b) comprising the steps of: receiving a first read command by a linked-list controlling module (3); and comparing the first read command with the existing read commands and the existing write commands buffered in a global order buffer module (4) to determine whether the first read command is dependency-hit; wherein if the first read command is dependency-hit, triggering a read snarfing process, processing the first read command with the existing read command or the existing write command to form a next read command, loading the next read command into the global order buffer module (4), arranging snarfed data associating the next read command in a data buffer module (2), and scheduling the next read command by a scheduling module (8) for retrieving and transferring the snarfed data associating the next read command from the data buffer module (2), wherein the snarfed data comprising read data or write data.

In accordance with an embodiment of the present invention, the step of processing the first read command with the existing read command or the existing write command comprising: determining the first read command is snarfing write data or snarfing read data; adopting the first read command as the next read command; and determining identity of the existing read command or the existing write command.

In accordance with an embodiment of the present invention, if the first read command is snarfing write data, the step of arranging the snarfed data associating the next read command in the data buffer module (2) comprising the steps of: receiving signal from the linked-list controlling module (3) of the next read command and identity of the existing write command; loading the snarfed write data from a write data buffer (22b) to a snarf data first-in-first-out buffer (26) in the data buffer module (2); and loading the snarfed write data from the snarf data first-in-first-out buffer (26) to a read data buffer (24b) in the data buffer module (2).

In accordance with an embodiment of the present invention, if the first read command is snarfing read data, the step of arranging the snarfed data associating the next read command in the data buffer module (2) comprising the step of: receiving signal from the linked-list controlling module (3) of the next read command and identity of the existing read command; and arranging the snarfed read data in the read data buffer (24b) in the data buffer module (2).

Figure 5:
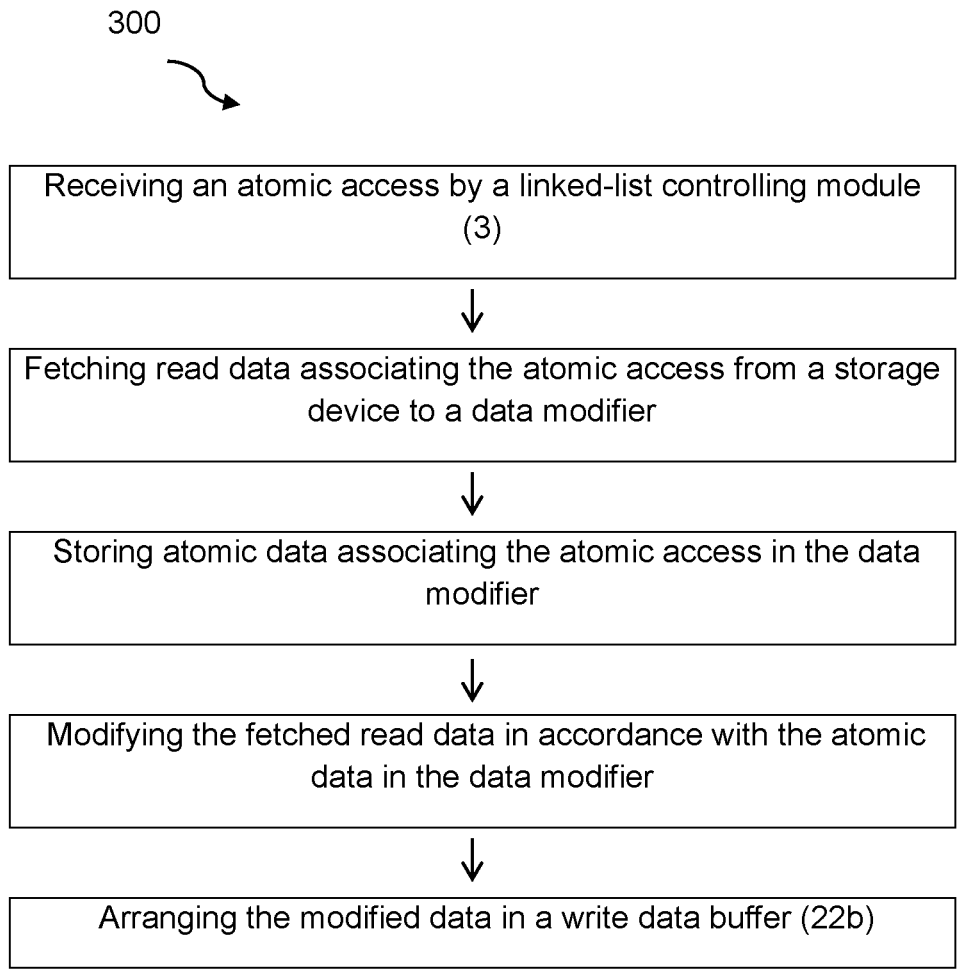
FIG. 5 shows a method for performing an atomic operation of a storage device according to an embodiment of the present invention.

Referring to FIG. 5, the present invention also relates to a method (300) for performing an atomic operation of a storage device, said method comprising the steps of: receiving an atomic access by a linked-list controlling module (3); fetching read data associating the atomic access from a storage device to a data modifier; storing atomic data associating the atomic access in the data modifier; modifying the fetched read data in accordance with the atomic data in the data modifier; and arranging the modified data in a write data buffer (22b).

Figure 6:
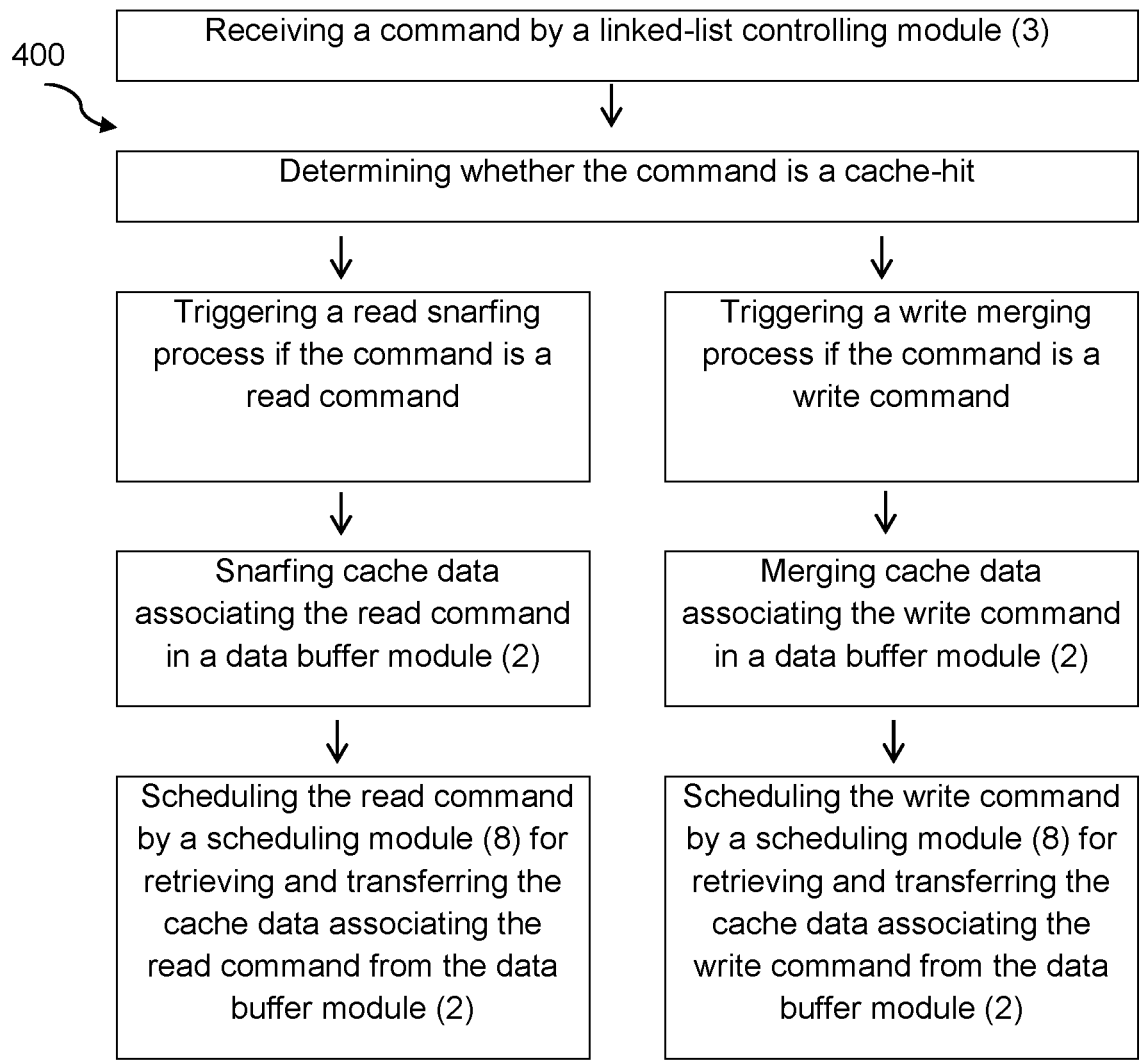
FIG. 6 shows a method for performing data caching of a storage device according to an embodiment of the present invention.

Referring to FIG. 6, the present invention also relates to a method (400) for performing data caching of a storage device, said method comprising the steps of: receiving a command by a linked-list controlling module (3); and determining whether the command is a cache-hit; wherein if the command is a read command, triggering a read snarfing process, snarfing cache data associating the read command in a data buffer module (2), and scheduling the read command by a scheduling module (8) for retrieving and transferring the cache data associating the read command from the data buffer module (2); wherein if the command is a write command, triggering a write merging process, merging cache data associating the write command in a data buffer module (2), and scheduling the write command by a scheduling module (8) for retrieving and transferring the cache data associating the write command from the data buffer module (2).

Hereinafter, examples of the present invention will be provided for more detailed explanation. It will be understood that the examples described below are not intended to limit the scope of the present invention.

Examples

Write Merge Flow

A user issues a new write command and corresponding write data to the memory controller system (100) via the AXI interface. The new write command goes to the linked-list controlling module (3) and the write data goes to the write data and strobe first-in-first-out buffer (27). Thereafter, the linked-list controlling module (3) checks for dependency-hit of the new write command against existing write commands in the read-write command buffer (6). If there is a dependency hit where the new write command and one of the existing commands go to the same address, a write merging process is triggered. The new write command will be merged into the read-write command buffer (6). The linked-list controlling module (3) will notify the write data and strobe first-in-first-out buffer (27) of the write merging process along with identity of the matched existing command. Subsequently, the new write data will be popped from the write data and strobe first-in-first-out buffer (27) and loaded into the existing write data location of the write data buffer (22b). Strobe will be used to control buffer byte-enable to overwrite specific bytes. Strobe of the new write data will be merged into existing write strobe location of the write strobe buffer (28) which is implemented using register/flip-flops. Thereafter, the merged write command can be scheduled by the arbiter (9). The merged write command may not be scheduled to the storage device immediately. The merged write command may continue to merge with future write commands that go to the same address. After the merged write command is sent to the DFI interface, the merged write data will be retrieved using the aforesaid identity and sent to the DFI interface with appropriate latency. Then, the aforesaid identity will be returned to the linked-list controlling module (3) and checked whether it can be released for reuse based on cache policy. For example, the aforesaid ID cannot be released if there is a cache-hit.

Write Merge Scenarios

If an existing full write, where all byte enable strobes are asserted, is followed by a new full write, the new write data will overwrite the existing write data and no changes are made to the existing write command.

If an existing full write is followed by a new partial write, where not all byte enable strobes are asserted, the new partial write data will overwrite specific bytes of the existing write data based on the new partial write strobe. No changes are made to the existing write command.

If an existing partial write is followed by a new full write and a read-modify operation occurs before the write merging process, the new write data will overwrite the modified write data. The existing partial write command is converted into the full write command. The read-modify operation occurs when the memory controller system (100) performs read from associated address and performs data merging with corresponding write data using strobe.

If an existing partial write is followed by a new full write and a read-modify operation occurs after the write merging process, the new write data will overwrite the existing write data, followed by the read-modify operation using the new strobe information (no modify operation because new strobe will indicate full write). The existing partial write command is converted into the full write command.

If an existing partial write is followed by a new partial write and a read-modify operation occurs before the write merging process, the new partial write data will overwrite the existing write data based on the new partial write strobe. No changes are made to the existing write command.

If an existing partial write is followed by a new partial write and a read-modify operation occurs after the write merging process, the new partial write data will overwrite the existing write data based on the new partial write strobe, followed by the read-modify operation using new strobe information. No changes are made to the existing write command.

Read Snarf Flow

A user issues a new read command to the memory controller system (100) via the AXI interface. Thereafter, the linked-list controlling module (3) checks for dependency-hit of the new read command against existing write commands in the read-write command buffer (6) and against existing read command in the read command buffer (5). If there is a dependency hit where the new read command and one of the existing commands go to the same address, a read snarfing process is triggered. Subsequently, the new read command will be dropped and a new read snarf command is created in the read-merge command buffer (7). The read-merge arbiter (10) then schedules the read snarf command.

If the read snarf command relates to write data snarfing, the write data controller (22a) is notified that a read snarf command occurs along with its identity. Data will be retrieved from the write data buffer (22b). The data will then be loaded into the snarf data first-in-first-out buffer (26). The data will be transferred to the read data buffer (24b) when the read data buffer write port is idle. Finally, the read data is returned to the AXI interface. Then, the aforesaid identity will be returned to the linked-list controlling module (3) and checked whether it can be released for reuse based on cache policy. For example, the aforesaid identity cannot be released if there is a cache-hit.

If the read command relates to read data snarfing, the read data controller (24a) is notified that a read snarf command occurs along with its identity. Data will be snarfed from the read data buffer (24b). Thereafter, the snarfed data is returned to the AXI interface when the snarfed data in the read data buffer (24b) is available. Then, the aforesaid identity will be returned to the linked-list controlling module (3) and checked whether it can be released for reuse based on cache policy. For example, the aforesaid identity cannot be released if there is a cache-hit.

Data Cache Flow

The cache control logic will preselect an eviction candidate per tag. Eviction policy is configurable. The examples of the eviction policies include, but not limited to, first-in-first-out (FIFO) and least recently used (LRU). If the cache has empty entries (cold cache), the empty entries are always selected as the eviction candidate. The cache can refer to all the local SRAM devices or a merged SRAM buffer between the read and write data buffers as a full cache.

When a user issues a new command to the memory controller system (100) via the AXI interface, the linked-list controlling module (3) will check for cache-hit. If the new command is a write command and there is a free slot in cache, identity and address of the write data is stored into cache and the write data is stored. If the new command is a write command and the address matches an existing slot in the cache, the write command is merged into the cache entry.

If the new command is a read command, read snarfing process is triggered and the read command snarfs existing cache data.

Atomic Operation Flow

A user issues an atomic access to the memory controller system (100) via the AXI interface. The atomic access is stored in the read-write command buffer (6). The atomic access flow is similar to the read-modify-write (RMW) flow. For example, the atomic access will first issue a read command to fetch read data from the DRAM to the data modifier. Atomic data will also be retrieved from the write data buffer (22b) and stored in the data modifier. Thereafter, the fetched read data will be modified according to atomic operations including, but not limited to, increment, decrement, bit shifts, Boolean operations (AND, OR, NOT, XOR) and memory swaps. After that, the modified data will be written into write data buffer (22b) and the read-write command buffer (6) will be notified that the modified data is ready. Then, the atomic access will issue a write command to a DRAM location. Depending on atomic access requirement, pre or post-modified data can return to the user via the AXI interface. For instance, memory swaps will return pre-modified data.

The above-mentioned memory controller system (100) overcomes the problems and shortcomings of the existing memory controller systems. In the present invention, the write merging and read snarfing capabilities reduce number of read/write commands issued to the DRAM and thus reserve command bandwidth for other commands. Moreover, the read snarfing capability leads to lower round trip latency because data retrieval is performed from the local SRAM instead of from the DRAM memory. Likewise, data can be retrieved and returned quickly through controller-based caching in the present invention to increase performance. In addition, the controller-based atomic operations in the present invention enhance system performance and power by reducing memory traffic between the shared memory and the memory controller system (100). Furthermore, the read-write command buffer (6) in the present invention can flexibly handle read or write cycles to allow the memory controller (100) to optimize memory traffic.

The exemplary implementation described above is illustrated with specific characteristics, but the scope of the invention includes various other characteristics.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

It is to be understood that any prior art publication referred to herein does not constitute an admission that the publication forms part of the common general knowledge in the art.

The invention claimed is:

1. A memory controller system for a storage device, the memory controller system comprising:
   a scheduling module,
   a data buffer module comprising a write data unit, a read data unit and a snarf data first-in-first-out buffer, configured to store data transferred to or received from the storage device;
   a global order buffer module comprising a read command buffer, a read-write command buffer and a read-merge command buffer, configured to buffer a plurality of existing commands; and
   a linked-list controlling module configured to receive and process a first command comprising a write command or a read command;
   wherein
   if the first command is a first write command, the memory controller system is configured for
   receiving the first write command;
   comparing the first write command with existing write command buffered in the global order buffer module to determine whether the first write command is dependency-hit;
   triggering a write merging process if the first write command is dependency-hit
   processing the first write command with the existing write command to form a next write command by:

dropping the first write command;
merging the first write command into an existing command to form the next write command; and
determining identity of the existing command;
loading the next write command into the global order buffer module;
arranging write data associating the next write command in the data buffer module by:
receiving signal from the linked-list controlling module of the next write command and the identity of the existing command;
loading the write data from a write data and strobe first-in-first-out buffer to a write data buffer in the data buffer module; and
merging new strobe with existing strobe in a write strobe buffer; and
scheduling the next write command for retrieving and transferring the write data associating the next write command from the data buffer module.

2. The memory controller system as claimed in claim 1, wherein the linked-list controlling module is configured to build a linked-list based on dependencies to allow for pre-scheduling age information to be stored in the linked-list.

3. The memory controller system as claimed in claim 1, wherein the write data unit comprising a write data controller and a write data buffer configured to identify the write command and retrieving write data from the write data buffer.

4. The memory controller system as claimed in claim 1, wherein the read data unit comprising a read data controller and a read data buffer configured to identify the read command and retrieving read data from the read data buffer.

5. The memory controller system as claimed in claim 1, wherein the scheduling module comprising an arbiter and a read-merge arbiter configured to operate in parallel.

6. The memory controller system as claimed in claim 1, wherein the data buffer module further comprises a data modifier and a data arbiter configured to support atomic operations of the memory controller system.

7. The memory controller system as claimed in claim 1, wherein the data buffer module further comprises a write data and strobe first-in-first-out buffer and a write strobe buffer configured to control write data and buffer byte using strobe.

8. The memory controller system as claimed in claim 1, wherein the linked-list controlling module comprising a cache matching unit.

9. The memory controller system as claimed in claim 8, wherein the cache matching unit comprises a linked-list construction logic configured to build a linked-list based on addressing dependencies and/or DRAM resource dependencies.

10. A method for memory scheduling of a storage device, said method comprising:
receiving a first command by a linked-list controlling module;
determining the first command is a write command or a read command; and
comparing the first write command or the first read command with the existing commands buffered in a global order buffer module to determine whether the first write command or the first read command is dependency-hit;
wherein if the first write command or the first read command is dependency-hit, triggering a write merging process or a read snarling process, processing the first write command or the first read command with the existing command to form a next write command or a next read command, loading the next write command or the next read command into the global order buffer module, arranging write data or snarfed data associating the next write command or the next read command in a data buffer module, and scheduling the next write command or the next read command by a scheduling module for retrieving and transferring the write data or the snarfed data associating the next write command or the next read command from the data buffer module
wherein if the first command is the first write command, the step of processing the first write command with the existing command comprising:
dropping the first write command;
merging the first write command into the existing command to form the next write command; and
determining identity of the existing command;
wherein the step of arranging the write data associating the next write command in the data buffer module comprising:
receiving signal from the linked-list controlling module of the next write command and identity of the existing command;
loading the write data from a write data and strobe first-in-first-out buffer to a write data buffer in the data buffer module; and
merging new strobe with existing strobe in a write strobe buffer.

11. The method as claimed in claim 10, wherein the write data is received by the write data and strobe first-in-first-out buffer of the data buffer module.

12. The method as claimed in claim 10, wherein the step of retrieving and transferring the write data associating the next write command comprising:
retrieving the write data associating the next write command using the identity of the existing command;
verifying the identity of the existing command at the linked-list controlling module; and
transferring the write data associating the next write command from the data buffer module.

13. The method as claimed in claim 10, wherein if the first command is the read command, the step of processing the first read command with the existing command comprising:
determining the first read command is snarling write data or snarfing read data;
adopting the first read command as the next read command; and
determining identity of the existing command.

14. The method as claimed in claim 13, wherein if the first read command is snarfing write data, the step of arranging the snarfed data associating the next read command in the data buffer module comprising:
receiving signal from the linked-list controlling module of the next read command and identity of the existing command;
loading the snarfed write data from a write data buffer to a snarf data first-in-first-out buffer in the data buffer module; and
loading the snarfed write data from the snarf data first-in-first-out buffer to a read data buffer in the data buffer module.

15. The method as claimed in claim 13, wherein if the first read command is snarfing read data, the step of arranging the snarfed data associating the next read command in the data buffer module comprising:

receiving signal from the linked-list controlling module of the next read command and identity of the existing command; and arranging the snarfed read data in the read data buffer in the data buffer module.

* * * * *